United States Patent [19]

Durham

[11] 4,043,373
[45] Aug. 23, 1977

[54] RIM STRIP FOR BICYCLE WHEELS

[76] Inventor: Roger Owen Durham, 3944 Marathon St., Los Angeles, Calif. 90029

[21] Appl. No.: 629,139

[22] Filed: Nov. 5, 1975

[51] Int. Cl.² .................................................. B60C 19/00
[52] U.S. Cl. ............................. 152/365; 152/DIG. 13
[58] Field of Search ............... 152/365, 366, 372, 349, 152/350, 203, 204, 207, 427, DIG. 13; 301/37 SA

[56] References Cited

U.S. PATENT DOCUMENTS

| 557,441 | 3/1896 | Scott | 152/349 X |
|---|---|---|---|
| 598,330 | 2/1898 | Vreeland | 152/207 X |
| 1,413,834 | 4/1922 | Dickinson | 152/349 X |
| 1,939,095 | 12/1933 | Balfe | 152/366 |

Primary Examiner—Robert B. Reeves
Assistant Examiner—Francis J. Bartuska

[57] ABSTRACT

A flexible bicycle rim strip has two free ends and a securing hole near each end. The free ends insert through a rectangular valve stem hole in the rim, and are secured to adjacent spoke nipples.

4 Claims, 5 Drawing Figures

RIM STRIP FOR BICYCLE WHEELS

CROSS REFERENCES TO RELATED APPLICATIONS

None.

BACKGROUND OF THE INVENTION

This invention pertains to bicycle wheels having pneumatic tires, inner tubes, rims, spokes and nipples, and a flexible rim strip. In such wheels, the spoke nipples are inserted through holes in the rim, and engage the threaded outward ends of the spokes.

In the past, inside the rim, a flexible rim strip has lain over the heads of the spoke nipples, to protect the inner tube from the rough nipple heads. The circular rim strip has had a hole in it for the valve stem to pass through. The circular rim strips have been made by joining together the free ends of a strip of rubber with adhesive, and punching a hole for the valve stem, usually in the area of double thickness.

During recent years, tires having smaller cross sections have become popular, along with correspondingly narrow rims, resulting in a crowded situation at the valve stem. Almost no room has been left for the rim strip on either side of the valve stem. The narrow rim strips have been almost cut in two by their valve stem holes, and have been prone to breaking because of it.

In addition, the tube valve stem is often coated with rubber, causing friction between it and the rubber rim strip, making mounting and dismounting of the tire difficult.

SUMMARY OF THE INVENTION

According to the invention, a flexible rim strip has two free ends, with a securing means near each free end which is adapted for engaging a spoke nipple adjacent the valve stem. The free ends insert through a rectangular valve stem hole in the rim.

The valve stem does not pass through a hole in the rim strip, nor does the rim strip pass to the sides of the valve stem, thus eliminating the crowded condition at that point. Interference and friction between rim strip and valve stem is eliminated, making mounting and dismounting of the tire easier. The rim strip is not disturbed when the tube is removed for repairs. In their preferred embodiment, the rim strips can be simple strips of rubber with small holes punched near each end, thus eliminating the usual cementing of their free ends.

DETAILED DESCRIPTION OF THE DRAWINGS

Figure 1:
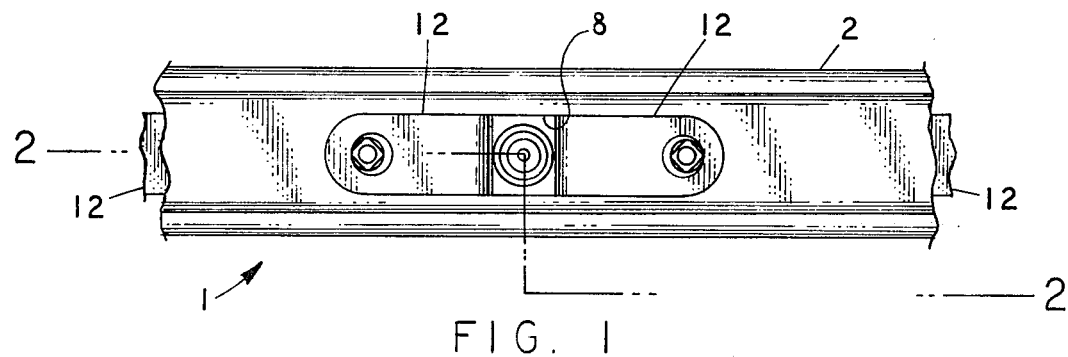
FIG. 1 shows a plan view of a wheel embodying features of the invention, as it would appear from inside the wheel.
Figure 2:
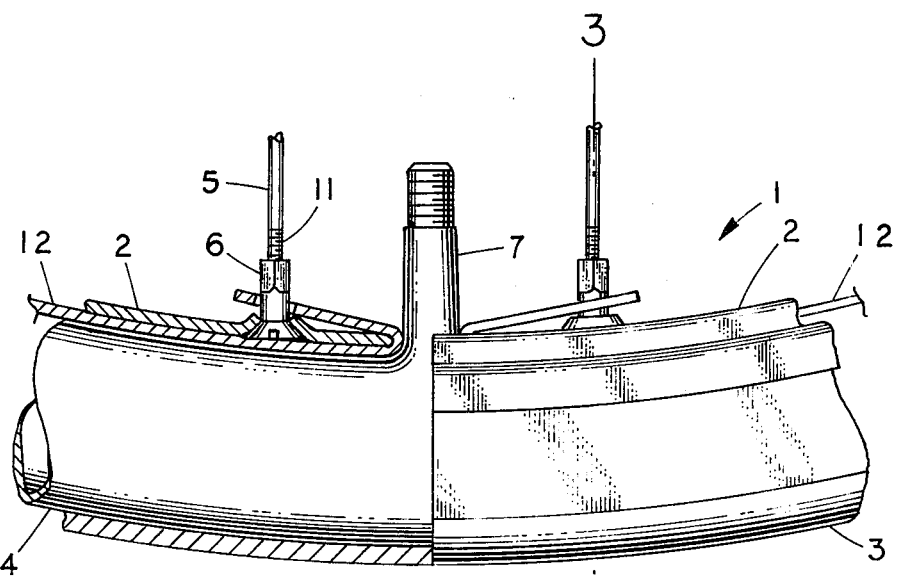
FIG. 2 shows a partial vertical section and partial side view of a portion of the rim and tire near the valve stem, taken along line 2—2 of FIG. 1.

Referring to FIG.'s 1 and 2, a portion of a bicycle wheel 1 is comprised of a rim 2, a tire 3, an inner tube 4, a spoke 5, a spoke nipple 6, and a flexible rim strip 12.

The inner tube 4 has a valve stem 7 which inserts through a valve stem hole 8 in said rim 2. Said valve stem hole 8 is preferably rectangular or square in shape.

Said spoke 5 has a threaded end 11, which engages threads in said nipple 6. The rim strip 12 has a pair of free ends 9 having a pair of securing holes 10 near said free ends 9. The rim strip 12 lays inside said rim 2; its free ends 9 are inserted through said valve stem hole 8, and are secured to the spoke nipples 6 adjacent the valve stem hole.

Figure 3:
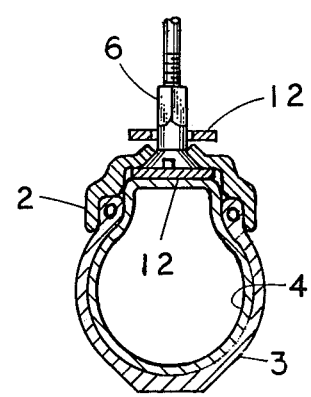
FIG. 3 is a median section, taken along line 3—3 of FIG. 2, showing a section at a spoke nipple adjacent the valve stem.

FIG. 3 shows rim strip 12 laying inside the rim 2 and again outside the rim, with the spoke nipple 6 inserted through the securing hole 10 in said rim strip 12.

Figure 4:
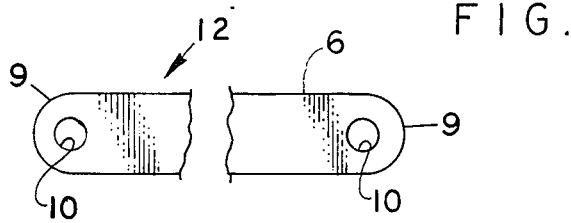
FIG. 4 shows a plan view of the ends of a rim strip according to the preferred embodiment.

In FIG. 4, the free ends 9 of the flexible rim strip 12 are shown in plan view, again illustrating elements described above.

Figure 5:
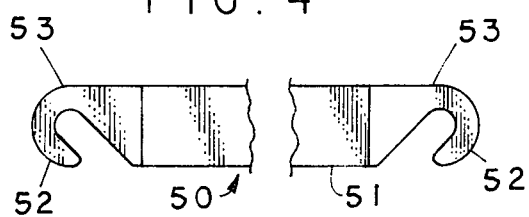
FIG. 5 shows a plan view of the free ends of a rim strip of alternate form.

In FIG. 5, a pair of free ends 53 of a flexible rim strip means 50 are shown in plan view. A pair of hooks 52, of such material as plastic or metal, are secured by adhesive to a flexible rim strip 51.

Said hooks 52 and said nipple holes 10 are thus both rim strip securing means near the free ends of their respective flexible rim strips; a variety of such rim strip securing means could be devised.

MODE OF OPERATION

The free ends 9 of the flexible rim strip 12 insert through the valve stem hole 8 of the rim 2, and are secured to the spoke nipples 6, which insert through the securing holes 10 in said rim strip 12.

The rim strip covers all the heads of the nipples, including the nipples which secure its ends, thus protecting the inner tube.

I claim:

1. In a wheel having spokes with threaded outward ends, a rim with spoke nipple holes, spoke nipples inserted through said spoke nipple holes in said rim and engaging said threaded outward ends of said spokes, and an inflatable tube with a tube valve stem the combination of:
   a. a valve stem hole in said rim adaptable for insertion of said tube valve stem and the free ends of a flexible rim strip;
   b. a flexible rim strip having two free ends with a rim strip securing means near each free end, said free ends adapted for insertion through said valve stem hole in said rim, with said rim strip securing means engaging said spoke nipples adjacent said valve stem hole in said rim.

2. Apparatus according to claim 1, wherein said valve stem hole in said rim is substantially rectangular.

3. Apparatus according to claim 1, wherein said rim strip securing means near each free end of said flexible rim strip is a securing hole in said rim strip.

4. Apparatus according to claim 1 wherein said rim strip securing means near each free end of said rim strip is a hook secured to said free end of said rim strip.

* * * * *